United States Patent
King

(10) Patent No.: US 8,505,938 B2
(45) Date of Patent: Aug. 13, 2013

(54) SWAY BAR ASSEMBLY AND VEHICLE INCLUDING SAME

(75) Inventor: Darin D. King, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 13/117,458

(22) Filed: May 27, 2011

(65) Prior Publication Data

US 2012/0299265 A1   Nov. 29, 2012

(51) Int. Cl.
*B60G 21/055* (2006.01)
*B60G 11/15* (2006.01)

(52) U.S. Cl.
USPC ............... 280/124.107; 267/190; 267/275; 280/124.135; 280/124.152; 280/124.168

(58) Field of Classification Search
USPC ........ 280/5.511, 5.514, 6.157, 6.16, 124.106, 280/124.107, 124.135, 124.152, 124.164, 280/124.166, 124.168; 267/188, 190, 194, 267/273, 275, 277, 278, 286, 248, 251–255
See application file for complete search history.

(56) References Cited

U.S. PATENT DOCUMENTS

| | | | |
|---|---|---|---|
| 1,618,703 A * | 2/1927 | Frink | 267/26 |
| 2,113,071 A * | 4/1938 | Allen | 267/194 |
| 2,169,336 A * | 8/1939 | Best | 267/254 |
| 2,227,762 A * | 1/1941 | Ronning | 267/275 |
| 2,426,513 A * | 8/1947 | Linn | 267/275 |
| 2,455,787 A * | 12/1948 | Linn | 267/275 |
| 2,606,021 A * | 8/1952 | Hexel | 267/275 |
| 2,776,147 A * | 1/1957 | Bamford | 280/124.109 |
| 2,907,575 A * | 10/1959 | Locker | 280/43.2 |
| 3,263,984 A * | 8/1966 | Linn | 267/275 |
| 3,292,945 A * | 12/1966 | Dangauthier | 280/6.159 |
| 3,337,236 A | 8/1967 | Peterson | |
| 3,764,157 A * | 10/1973 | LeBlanc | 280/6.154 |
| 4,281,850 A * | 8/1981 | Studer | 280/124.106 |
| 4,648,620 A | 3/1987 | Nuss | |
| 5,074,582 A * | 12/1991 | Parsons | 280/124.107 |
| 5,161,818 A * | 11/1992 | Kopieczek | 280/124.107 |
| 5,263,736 A | 11/1993 | Stevens | |
| 5,411,287 A * | 5/1995 | Henschen | 280/124.169 |
| 5,716,042 A | 2/1998 | Derviller | |
| 6,022,030 A * | 2/2000 | Fehring | 280/5.511 |
| 6,328,323 B1* | 12/2001 | Elser | 280/124.152 |
| 6,357,543 B1* | 3/2002 | Karpik | 180/182 |
| 6,698,767 B2 | 3/2004 | Hagan | |
| 6,722,669 B1 | 4/2004 | Stammereich | |
| 6,752,406 B2* | 6/2004 | Pierce et al. | 280/86.5 |
| 6,832,772 B2 | 12/2004 | Conover | |
| 7,237,785 B2* | 7/2007 | Kraus et al. | 280/124.106 |
| 7,543,832 B2* | 6/2009 | Nelson et al. | 280/124.107 |

* cited by examiner

*Primary Examiner* — Joseph Rocca
*Assistant Examiner* — Laura Freedman
(74) *Attorney, Agent, or Firm* — Ulmer & Berne, LLP

(57) ABSTRACT

A sway bar assembly includes a sway bar, a biasing member, and a winder assembly. The sway bar includes a central portion, a left end portion, and a right end portion. The central portion is configured for pivotal coupling to a frame of a vehicle. The left end portion is configured for coupling with a left support arm. The right end portion is configured for coupling with a right support arm. The biasing member is configured to be fixed to a frame of a vehicle. The winder assembly is coupled with the biasing member and configured to facilitate selective movement of the biasing member with respect to the sway bar.

16 Claims, 7 Drawing Sheets

US 8,505,938 B2

SWAY BAR ASSEMBLY AND VEHICLE INCLUDING SAME

TECHNICAL FIELD

A sway bar assembly includes a sway bar, a biasing member, and a winder assembly. The winder assembly can be coupled with the biasing member and configured to facilitate selective movement of the biasing member with respect to the sway bar.

BACKGROUND

Variable length shock absorbers are provided on some conventional vehicles to permit adjustment of the overall ride height of the vehicle. Typically, these variable length shock absorbers are adjustable through manual rotation of an adjustment collar. To change the overall ride height of these conventional vehicles, the variable length shock absorbers are unloaded (e.g., by lifting the vehicle from the ground) and each adjustment collar of the variable length shock absorbers are independently adjusted. Adjustment of the height of a vehicle having variable length shock absorbers can be time consuming and difficult. In addition, the adjustment collars can be prone to failure and can be costly to maintain.

SUMMARY

In accordance with one embodiment, a vehicle comprises a frame, a left support arm, a right support arm, a left wheel, a right wheel, and a sway bar assembly. The left support arm is pivotally coupled with the frame. The right support arm is pivotally coupled with the frame. The left wheel is rotatably coupled with the left support arm. The right wheel is rotatably coupled with the right support arm. The sway bar assembly comprises a sway bar, a biasing member, and a winder assembly. The sway bar comprises a central portion, a left end portion, and a right end portion. The central portion is pivotally coupled with the frame. The left end portion is coupled with the left support arm. The right end portion is coupled with the right support arm. The biasing member is fixed to the frame. The winder assembly is coupled with the biasing member and is configured to facilitate selective movement of at least a portion of the biasing member with respect to the sway bar.

In accordance with another embodiment, a sway bar assembly comprises a sway bar, a biasing member, and a winder assembly. The sway bar comprises a central portion, a left end portion, and a right end portion. The central portion is configured for pivotal coupling to a frame of a vehicle. The left end portion is configured for coupling with a left support arm. The right end portion is configured for coupling with a right support arm. The biasing member is configured to be fixed to a frame of a vehicle. The winder assembly is coupled with the biasing member and configured to facilitate selective movement of at least a portion of the biasing member with respect to the sway bar.

In accordance with yet another embodiment, a vehicle comprises a frame, a left support arm, a right support arm, a left wheel, a right wheel, a sway bar assembly, a left link member, and a right link member. The left support arm is pivotally coupled with the frame. The right support arm is pivotally coupled with the frame. The left wheel is rotatably coupled with the left support arm. The right wheel is rotatably coupled with the right support arm. The sway bar assembly comprises a sway bar, a torsion spring, and a winder assembly. The sway bar comprises a central portion, a left end portion, and a right end portion. The central portion is pivotally coupled with the frame. The left end portion is coupled with the left support arm. The right end portion is coupled with the right support arm. The torsion spring comprises a pair of distal ends. The torsion spring extends at least partially between the left end portion and the right end portion. Each of the distal ends is fixed to the frame. The winder assembly is coupled with the torsion spring and is configured to facilitate selective movement of at least a portion of the torsion spring with respect to the sway bar. The left link member is pivotally coupled with each of the left end portion of the sway bar and the left support arm. The right link member is pivotally coupled with each of the right end portion of the sway bar and the right support arm.

BRIEF DESCRIPTION OF THE DRAWINGS

Various embodiments will become better understood with regard to the following description, appended claims and accompanying drawings wherein:

DETAILED DESCRIPTION

Figure 1:
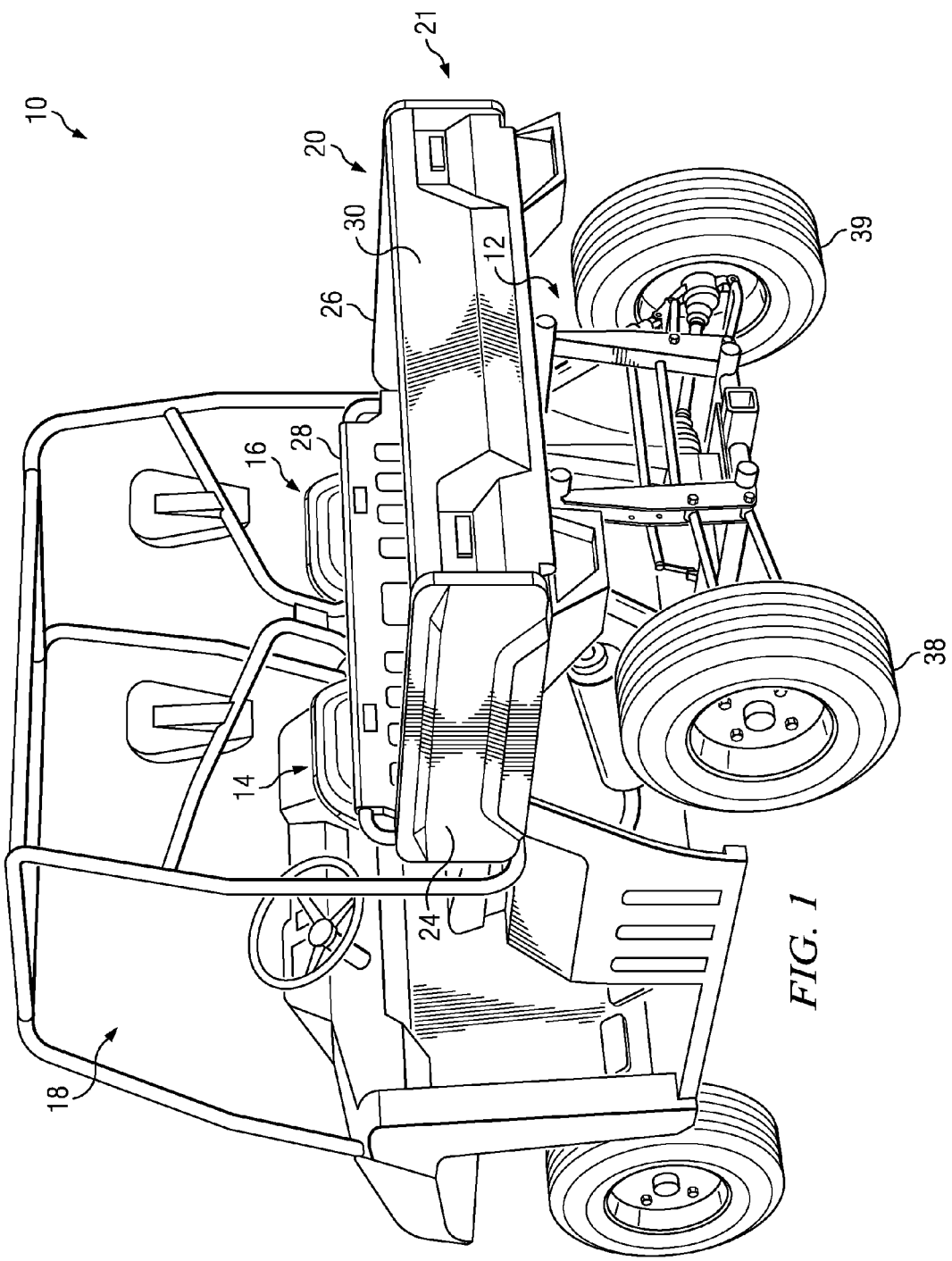
FIG. 1 is a left rear perspective view depicting a vehicle that includes a sway bar assembly, in accordance with one embodiment.

Embodiments are hereinafter described in detail in connection with the views of FIGS. 1-9, wherein like numbers indicate the same or corresponding elements throughout the views. A vehicle 10 can be provided that includes a vehicular frame 12. In one embodiment, as illustrated in FIG. 1, the vehicle 10 can comprise a utility vehicle, but can alternatively comprise, for example, an automobile, a dump truck, an all terrain vehicle ("ATV"), or a golf cart. The vehicular frame 12 can include any of a variety of structural and/or decorative rails, panels, and/or other components, and is typically, although not necessarily, formed from metal (e.g., steel and/or aluminum).

A front left seat 14 and a front right seat 16 (shown in FIG. 1) can each be supported by the vehicular frame 12 and can facilitate support of occupants within a passenger compartment 18 of the vehicle 10. The vehicle 10 can also include a utility bed 20 disposed at a rear 21 of the vehicle 10. The utility bed 20 can be coupled with the vehicular frame 12, either directly or indirectly, and such as through use of a hinge assembly (not shown). The hinge assembly can facilitate pivotable movement of the utility bed 20 with respect to the vehicular frame 12 of the vehicle 10 to allow for selective unloading of cargo from the utility bed 20. It will be appreciated that any of a variety of known conventional mechanisms or methods (none shown) can be provided to facilitate manual or powered movement of the utility bed 20 between the hauling and dumping positions under control of an operator of the vehicle 10. In other embodiments, a utility vehicle can include a non-dump type utility bed that is rigidly fixed to the utility vehicle's frame (e.g., a non-dumpable bed), or might not include a utility bed.

Figure 2:
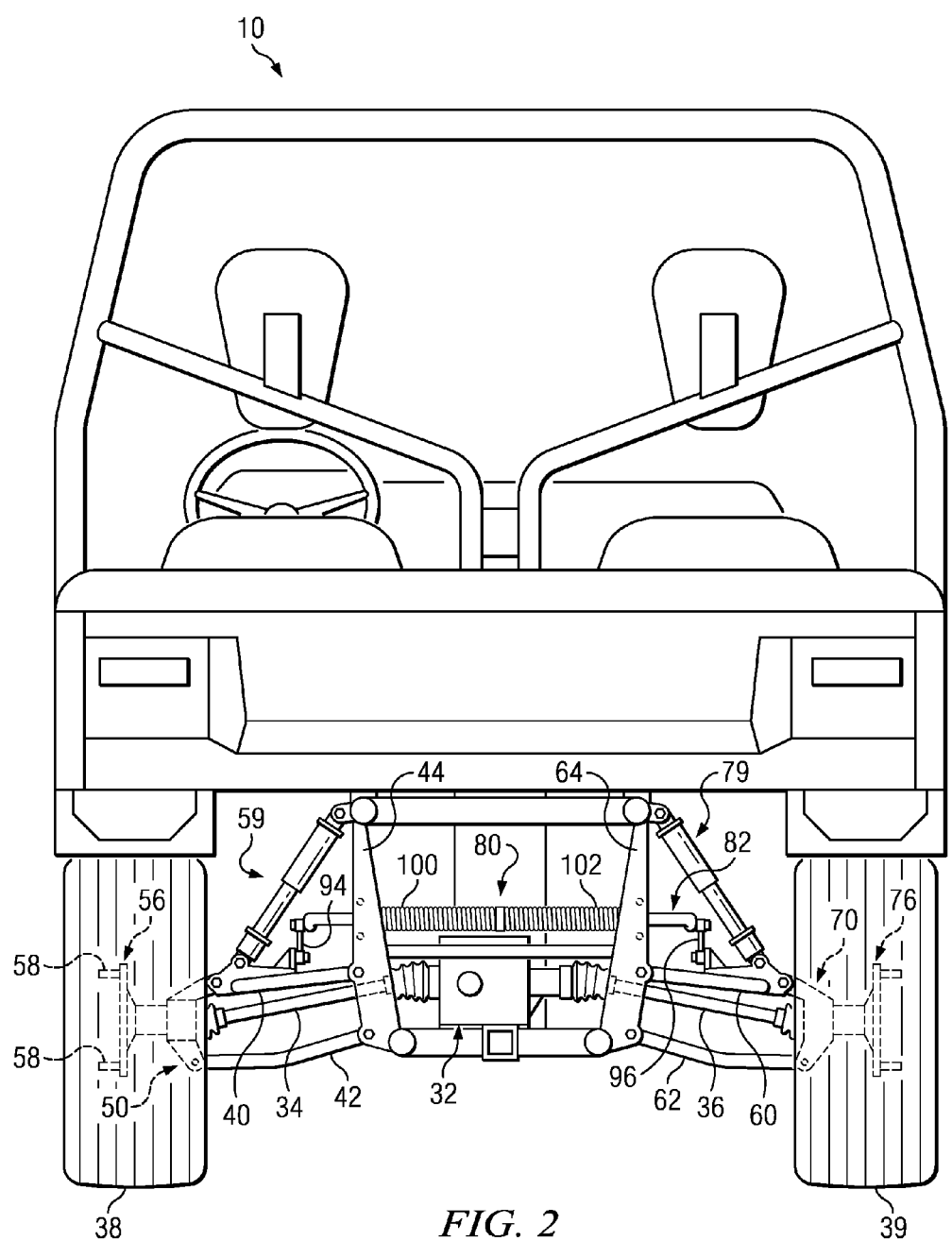
FIG. 2 is a rear elevational view depicting the vehicle and the sway bar assembly of FIG. 1, wherein the sway bar assembly includes a sway bar, a torsion spring, and a winder assembly and the vehicle includes a left upper support arm, a left lower support arm, a right upper support arm, and a right lower support arm.
Figure 3:
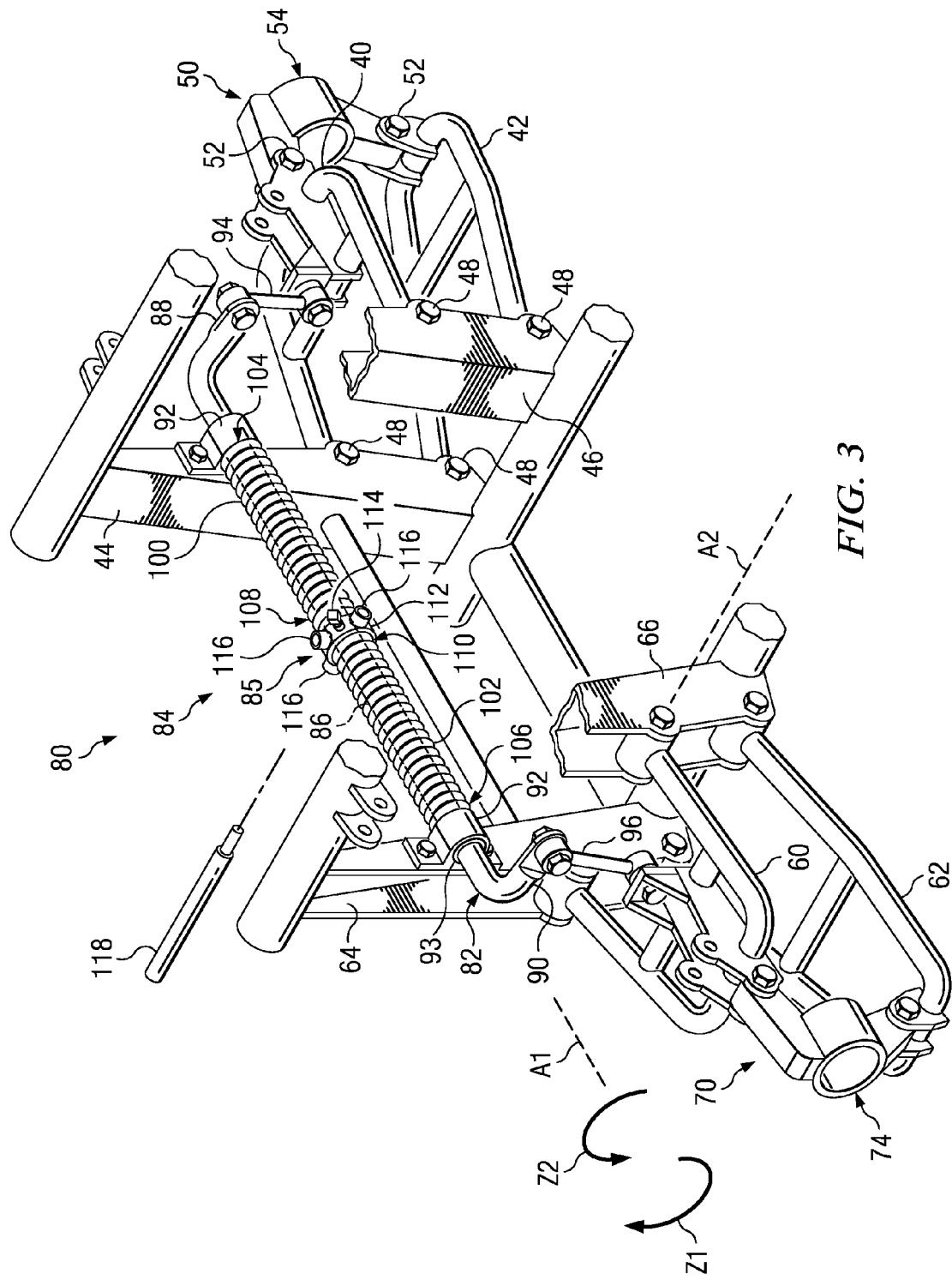
FIG. 3 is a right front perspective view depicting the sway bar assembly and certain associated components of the vehicle of FIG. 1, wherein other components of the vehicle have been removed for clarity of illustration.

In the embodiment of FIGS. 1-3, the utility bed 20 is shown to include a left sidewall 24, a right sidewall 26, and a front wall 28, each extending generally perpendicularly and upwardly from a bed floor (not shown) or locations adjacent to the bed floor. When the utility bed 20 is in the hauling position, as shown in FIG. 1, it will be appreciated that the left sidewall 24, the right sidewall 26, and the front wall 28 can cooperate with the bed floor to retain cargo within the utility bed 20. A tailgate 30, when closed, can also cooperate with the bed floor, the left sidewall 24, and the right sidewall 26 to retain cargo within the utility bed 20. It will be appreciated that the tailgate 30 can be pivotally coupled or otherwise moveable with respect to the bed floor, and can be selectively opened to facilitate loading of the utility bed 20 and/or to allow cargo (e.g., dirt) to pour from the utility bed 20 when the utility bed 20 is in a dumping position. In another embodiment, it will be appreciated that a rear wall can be provided in lieu of a tailgate, with the rear wall being rigidly affixed with respect to the bed floor. In yet another alternative embodiment, it will be appreciated that one or more sidewalls (e.g., 24 and/or 26) of a utility bed might be capable of being selectively opened (e.g., like tailgate 30) by an operator. In still another alternative embodiment, it will be appreciated that a utility bed might not include any tailgate and/or sidewalls and might, for example, comprise a flat-bed type configuration (e.g., commonly used for hauling small vehicles).

As illustrated in FIG. 2, a rear drive train of the vehicle 10 can include a rear final gear 32, a left axle shaft 34, and a right axle shaft 36. The left and right axle shafts 34, 36 can be operably coupled with the rear final gear 32 and respectively coupled with left and right rear wheels 38, 39. The rear final gear 32 can be operably coupled with an engine (not shown) such that the engine can operate the left and right axles 34, 36 to rotate the left and right rear wheels 38, 39, respectively. In one embodiment, a transmission (not shown) can be provided for coupling the rear final gear 32 with the engine. The transmission can have multiple gears to facilitate rotation of the left and right rear wheels 38, 39 at different speeds, and/or in different directions, during operation of the vehicle 10. The engine can comprise an internal combustion engine and/or an electric motor, for example.

The left and right rear wheels 38, 39 can be supported with respect to the vehicular frame 12 by left and right support arms. In one embodiment, as illustrated in FIGS. 2 and 3, the vehicle 10 can include a left upper support arm 40 and a left lower support arm 42 that cooperate to rotatably support the left rear wheel 38. The left upper support arm 40 can be pivotally coupled with a pair of left vertical members 44, 46 of the vehicular frame 12 such as with bolts 48, for example. The left lower support arm 42 can also be pivotally coupled with the left vertical members 44,46 (e.g., with bolts 48). The left upper and lower support arms 40, 42 can be pivotal about respective axes (e.g., A2). The left lower support arm 42 can be disposed beneath, and spaced from, the left upper support arm 40, as shown in FIGS. 2 and 3.

A left wheel knuckle 50 can be pivotally coupled with the left upper and left lower support arms 40, 42 (e.g., with bolts 52). As illustrated in FIG. 3, the left wheel knuckle 50 can define a bearing hub 54. A bearing (not shown) can be supported within the bearing hub 54 (e.g., in a press fit arrangement) and can rotatably support the left axle shaft 34. The left axle shaft 34 can extend from the bearing hub 54 and can support a left wheel hub 56, as illustrated in FIG. 2. The left wheel hub 56 can be releasably coupled with the left rear wheel 38 such as with lug bolts 58 (shown in FIG. 1), for example. A shock absorber 59 can be coupled with the left upper support arm 40 and the vehicular frame 12, as generally shown in FIG.

As illustrated in FIGS. 2, and 3, the vehicle 10 can include a right upper support arm 60 and a right lower support arm 62 that are similar in many respects to the left upper support arm 40 and the left lower support-arm 42. For example, the respective right upper and right lower support arms 60, 62 can be pivotally coupled with a pair of right vertical members 64, 66 of the vehicular frame 12 and can rotatably support the right rear wheel 39. A right wheel knuckle 70 can be pivotally coupled with the right upper and right lower support arms 60, 62 and can define a bearing hub 74 that supports a bearing (not shown). The bearing can rotatably support the right axle shaft 36 which can be coupled with a right wheel hub 76, as illustrated in FIG. 2. The right wheel hub 76 can be releasably coupled with the right rear wheel 39. A shock absorber 79 can be coupled with the right upper support arm 60 and the vehicular frame 12, as shown in FIG. 2. It will be appreciated that support arms of a vehicle can be provided in any of a variety of suitable alternative arrangements. For example, in one alternative embodiment, a vehicle can include only a single support arm for a particular wheel. It will also be appreciated that shock absorbers can be provided in any of a variety of other suitable configurations.

As illustrated in FIGS. 2 and 3, the vehicle 10 can include a sway bar assembly 80 that includes a sway bar 82, a torsion spring 84, and a winder assembly 85. The sway, bar 82 can include a central portion 86, a left end portion 88, and a right end portion 90. The central portion 86 is shown to extend between, and to interconnect the left and right end portions 88, 90. The central portion 86 is also shown to extend along an axis A1. While the central portion 86 is shown in FIG. 3 to be formed as a unitary structure with each of the left and right end portions 88 and 90, it will be appreciated that, in an alternative embodiment, a sway bar can include left and right end portions that are permanently or removably attached to a central portion.

The central portion 86 can be configured for pivotal attachment to the vehicular frame 12. In one embodiment, as illustrated in FIG. 3, a pair of bushing brackets 92 can pivotally couple the sway bar 82 with the left and right vertical members (e.g., 44, 64). The bushing brackets 92 can include bushings (e.g., 93) that surround the central portion 86 of the sway bar 82. Each of the bushings (e.g., 93) can be interposed between a respective one of the bushing brackets 92 and the respective left and right vertical members (e.g., 64, 84) to facilitate pivoting of the sway bar 82 with respect to the vehicular frame 12.

Each of the left and right ends 88, 90 of the sway bar 82 can be configured for coupling with one of the left support arms (e.g., 40, 42) and one of the right support arms (e.g., 60, 62), respectively. In one embodiment, as illustrated in FIG. 2, the left and right ends 88, 90 of the sway bar 82 can comprise lever arms that extend generally parallel with one another and extend generally perpendicularly from the central portion 86 of the sway bar 82. A left link member 94 can extend between, and can be pivotally coupled with, each of the left end 88 of the sway bar 82 and the left upper support arm 40. Similarly, a right link member 96 can extend between, and can be pivotally coupled with, each of the right end 90 of the sway bar 82 and the right upper support arm 60.

During operation of the vehicle 10, the sway bar 82 can resist vehicular roll. For example, when the left and right rear wheels 38, 39 move vertically relative to one another (e.g., during a turn), the sway bar 82 can impart torsion forces to the support arms (e.g., 40, 42, 60, 62) that resists vehicular roll. It will be, appreciated that the relative stiffness of the sway bar 82 can be selected to achieve a desired performance characteristic during vehicular roll.

The sway bar 82 can be pivotable about the axis A1, as illustrated in FIG. 3. In one embodiment, pivoting the sway bar 82 about the axis A1 (FIG. 3) can vary the ride height of the rear 21 of the vehicle 10. For example, pivoting of the sway bar 82 in a clockwise direction Z1 (as illustrated in FIG. 3 and as viewed from a right side of the vehicle 10) can result in pivoting of the left upper and right upper support arms 40, 60 in a downward direction, which can increase the ride height of the rear 21 of the vehicle 10. Conversely, pivoting of the sway bar 82 in a counter-clockwise direction Z2 can result in pivoting of the left upper and right upper support arms 40, 60 in an upward direction, which can decrease the ride height of the rear 21 of the vehicle 10.

The torsion spring 84 can be installed over the sway bar 82 such that the torsion spring 84 surrounds at least a portion of the central portion 86 of the sway bar 82. The torsion spring 84 can be coupled with the vehicular frame 12 and can extend at least partially between the left and right ends 88, 90 of the sway bar 82. In one embodiment, as illustrated in FIG. 3, the torsion spring 84 can extend coaxially with the central portion 86 of the sway bar 82 along the axis A1.

In one embodiment, as illustrated in FIGS. 2 and 3, the torsion spring 84 can comprise a left spring 100 and a right spring 102 that includes respective distal ends (e.g., 104, 106) and respective proximal ends (e.g., 108, 110). The distal ends 104, 106 can define opposite ends of the torsion spring 84, as illustrated in FIG. 3. The distal ends 104, 106 can be fixed to the bushing brackets 92 such as by welding or mechanical fastening, for example, and can accordingly be fixed to the vehicular frame 12 by way of the bushing brackets 92. Although the torsion spring 84 is shown to comprise an elongate helical torsion spring, it will be appreciated that in other embodiments, a torsion spring can comprise a plurality of torsion rods or any of a variety of other suitable biasing members.

The winder assembly 85 can be coupled with the torsion spring 84 and configured to facilitate selective movement of at least a portion of the torsion spring 84 with respect to the sway bar 82. In one embodiment, as illustrated in FIG. 3, the winder assembly 85 can include a winding collar 112. The proximal ends 108, 110 of the torsion spring 84 can be coupled with the winding collar 112, such as by welding or mechanical fastening, for example. The winding collar 112 can accordingly be disposed circumferentially about the central portion 86 of the sway bar 82, as shown in FIG. 3. The winder assembly 85 can also include a set bolt 114 that is in threaded engagement with the winding collar 112. The set bolt 114 can be threaded through a threaded aperture in the winding collar 112 and into contact with a notch or other feature (not shown). The set bolt 114 can thus be threaded relative to the winding collar 112 to effect movement of the set bolt 114 into and out of engagement with the central portion 86 of the sway bar 82 to selectively couple the winding collar 112 to the sway bar 82. It will be appreciated that a winder assembly might not include a threaded bolt (e.g., set bolt 114), but can be selectively fixed in position relative to a sway bar with any of a variety of other suitable fasteners (e.g., a roll pin, cotter pin or clevis pin), interlocking mechanical fixtures, or in any of a variety of other suitable alternative arrangements.

When the winding collar 112 is coupled with the sway bar 82, the torsion spring 84 can impart a torque to the sway bar 82 that can maintain the rear 21 of the vehicle 10 at a particular height. More particularly, the torsion spring 84 can impart a torque that counteracts pivoting of the sway bar 82 in a counter-clockwise direction Z2. The torque can be sufficient to hold the sway bar 82 in a position that achieves a particular ride height when the vehicle 10 is at rest. For example, as illustrated in FIGS. 1 and 2, the torsion spring 84 can impart enough torque upon the sway bar 82 (e.g., in the counter-clockwise direction Z2) to maintain the rear 21 of the vehicle 10 at a nominal height (e.g., midway between a fully loaded position and a fully unloaded position). During operation of the vehicle 10, the torsion spring 84 can impart a torque to the sway bar 82 which can prevent the rear wheels 38, 39 from losing contact with the ground (e.g., when the vehicle 10 encounters uneven terrain). Accordingly, in some embodiments, the torsion spring 84 can be installed on a vehicle in lieu of springs installed over the shock absorbers 59, 79 (e.g., a coil-over damper arrangement).

When the winding collar 112 is decoupled from the sway bar 82 (e.g., the set bolt 114 is threaded away from contact with the sway bar 82), the winding collar 112 can be rotated (e.g., repositioned) relative to the sway bar 82 about the axis A1 to facilitate adjustment of the ride height of the rear 21 of the vehicle 10. In one embodiment, the winding collar 112 can be configured for manual positioning. For example, as illustrated in the winding collar 112 can define a plurality of receptacles 116 that are configured to receive a winder bar 118. The winder bar 118 can be inserted into one of the receptacles 116 to allow a user to grasp the winder bar 118 and manually position the winding collar 112 with respect to the sway bar 82. In one embodiment, a pair of the winder bars (e.g., 118) can be utilized to facilitate more effective rotation of the winding collar 112. For example, the winding collar 112 can be initially rotated with a first winder bar. Once the first winder bar is no longer capable of rotating the winding collar 112 (e.g., further movement of the first winder bar is obstructed by the vehicular frame 12), a second winder bar can be inserted in the receptacle 116 immediately following the receptacle 116 occupied by the first winder bar. The first winder bar can be removed from its receptacle 116 and the winding collar 112 can be further rotated with the second winder bar. Once the second winder bar is no longer capable of rotating the winding collar 112, the first winder bar can be inserted in the receptacle 116 immediately following the receptacle 116 occupied by the second winder bar to continue rotation of the winding collar 112 with the first winder shaft.

The first and second winder bars can continue to be alternated until the winding collar 112 reaches a desired location and/or tension.

It will be appreciated that, in one embodiment, the winding collar 112 can be disposed about midway between the distal ends 104, 106 of the respective left and right springs 100, 102, as shown in FIGS. 2 and 3, to prevent binding of the left and right springs 100, 102 that might otherwise occur if the winding collar 112 were located immediately adjacent one of the distal ends (e.g., 104, 106). Though it will be appreciated that a winding collar might not be about midway between distal ends of a torsion spring. It will also be appreciated that a winding collar of a winder assembly can be rotated with respect to a sway bar in any of a variety of suitable alternative arrangements.

Once the winding collar 112 is rotated to a desired position, it can be recoupled with the sway bar 82 to allow the torsion spring 84 to impart torque to the sway bar 82. In one embodiment, once the winding collar 112 is rotated to a desired location, it can be temporarily held in place with the winder bar 118 until it can be secured to the sway bar 82 by tightening of the set bolt 114. Then, when the winding collar 112 is released, the torsion spring 84 can impart torque from the left and right springs 100, 102 to the sway bar 82.

The ride height of the rear 21 of the vehicle 10 can be increased or decreased according to the rotational direction of the winding collar 112 relative to the sway bar 82. In one embodiment, rotation of the winding collar 112 in a clockwise direction Z1 (FIG. 3) can decrease the overall ride height of the rear 21 of the vehicle 10, while rotation of the winding collar 112 in the counter-clockwise direction Z2 (FIG. 3) can increase the overall ride height of the rear 21 of the vehicle. 10.

Figure 4:
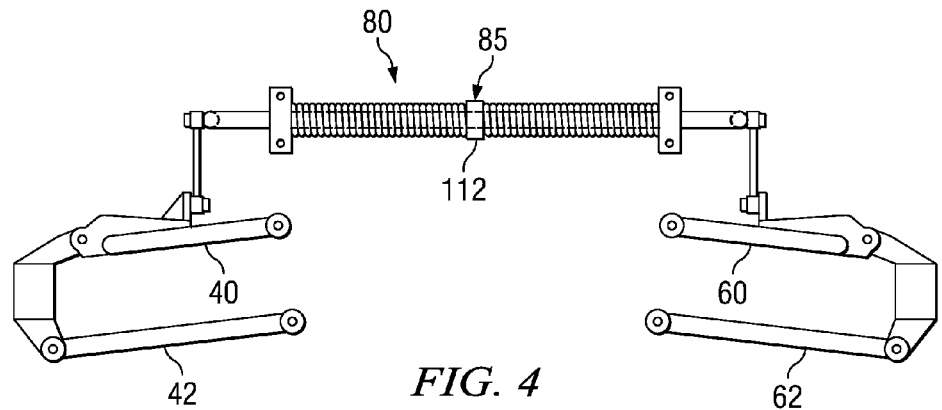
FIG. 4 is a schematic view depicting a nominal ride height position of the sway bar, the left upper support arm, the left lower support arm, the right upper support arm, and the right lower support arm of FIG. 2.
Figure 5:
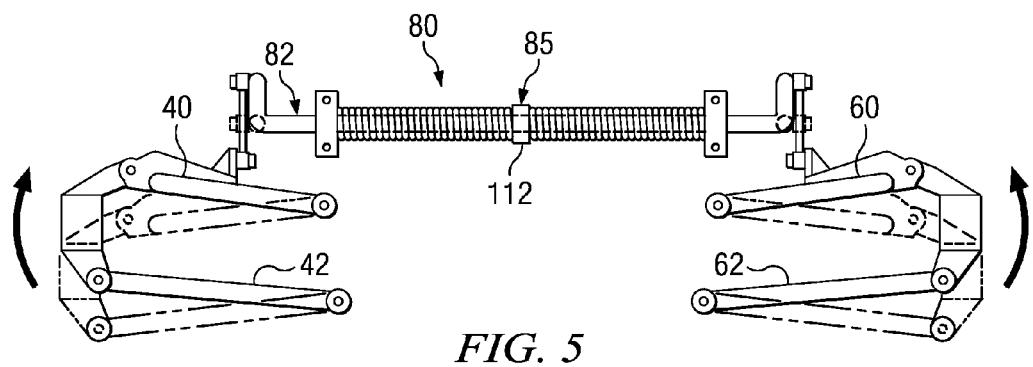
FIG. 5 is a schematic view contrasting the nominal ride height position of FIG. 4, shown in dashed lines, with an upwardly position, shown in solid lines.
Figure 6:
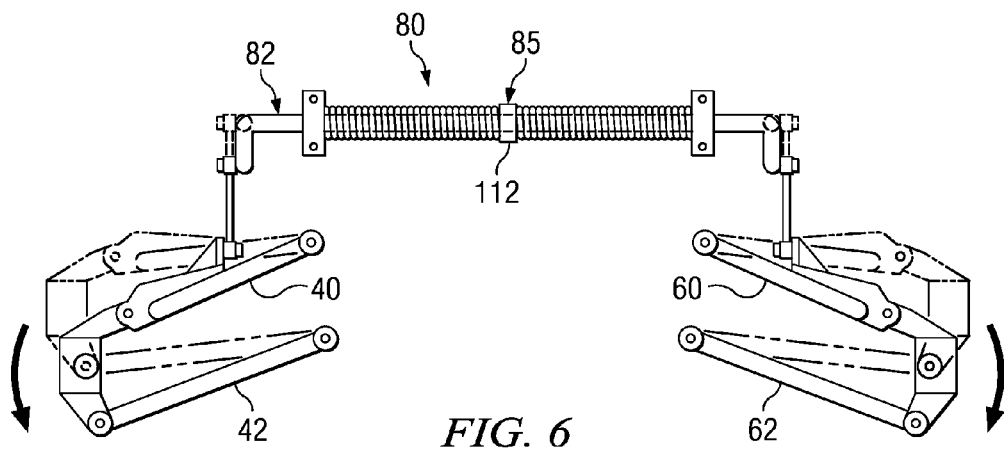
FIG. 6 is a schematic view contrasting the nominal ride height position of FIG. 4, shown in dashed lines, with a downwardly, position, shown in solid lines.

For example, with the rear 21 of the vehicle 10 at a nominal ride height (as illustrated in FIG. 4), the winding collar 112 can be decoupled from the sway bar 82 and rotated in the clockwise direction Z1 (FIG. 3). When the winding collar 112 is recoupled with the sway bar 82, the torsion spring 84 can maintain the left and right end portions 88, 90 of the sway bar 82 in a higher relative position than at a nominal ride height, as illustrated in FIG. 5. The left and right upper support arms 40, 60, can thus be pivoted upwardly, which can decrease the overall ride height of the rear 21 of the vehicle 10. Conversely, with the rear 21 of the vehicle 10 at a nominal ride height (as illustrated in FIG. 4), the winding collar 112 can be decoupled from the sway bar 82 and rotated in the counter-clockwise direction Z2. When the winding collar 112 is recoupled with the sway bar 82, the torsion spring 84 can maintain the left and right end portions 88, 90 of the sway bar 82 in a lower relative position, as illustrated in FIG. 6, which can pivot the left and right upper support arms 40, 60 downwardly, thereby increasing the overall ride height of the rear 21 of the vehicle 10.

It will be appreciated that the winding collar 112 can facilitate precise adjustment of the height of the rear 21 of the vehicle 10. In particular, the winding collar 112 might not be constrained to specific positions such as might be required on variable length shock absorbers. Instead, in some arrangements, the winding cellar 112 can be configured to allow rotation to a specific position to achieve a particular height. In addition, when the sway bar 82 is coupled with each of the left and right upper support arms 40, 60, as shown in FIGS. 2 and 3, the left and right upper support arms 40, 60 can be moved together, which can reduce the risk of improperly or inconsistently adjusting only a left or right side of the vehicle 10 (e.g., such as could occur when adjusting the height of the vehicle with variable length shock absorbers).

In one embodiment, the winding collar 112 can be repositioned relative to the sway bar 82 when the sway bar 82 is loaded (e.g., the weight of a rear portion of the vehicle 10 is supported by the left and right rear wheels 38, 39). As such, the ride height of the vehicle 10 can therefore be adjusted without lifting the rear 21 of the vehicle 10 off of the ground (e.g., with a jack). For example, with the weight of the rear 21 of the vehicle 10 supported by the left and right rear wheels 38, 39, the winding collar 112 can be decoupled from the sway bar 82 while being held in place with one of the winder bars (e.g., 118). The winding collar 112 can be rotated into a desired position with the winder bar (or a pair of the winder bars as described above) and recoupled with the sway bar 82. When the winding collar 112 is released, the torsion spring 84 can pivot the sway bar 82 into a different position to change the overall ride height of the rear 21 of the vehicle 10. It will therefore be appreciated that the position of the winding collar 112 can be adjusted without requiring repeated lifting of the vehicle 10 off of the ground.

Although the sway bar assembly 80 is described with respect to the rear 21 of the vehicle 10, it will be appreciated that a similar sway bar assembly can additionally or alternatively be provided on a front end of a vehicle.

Figure 7:
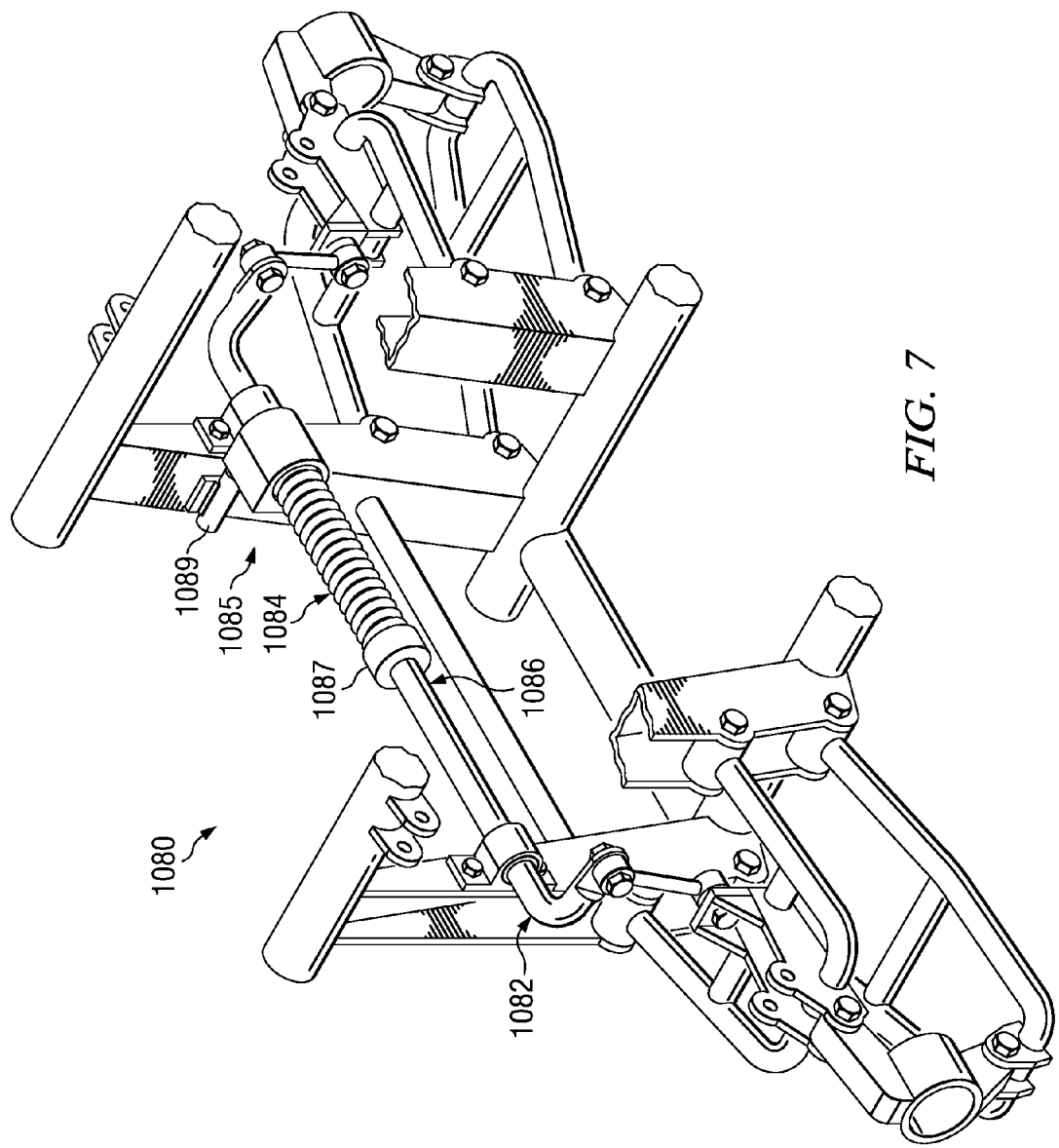
FIG. 7 is a right front perspective view depicting a sway bar assembly in accordance with another embodiment, wherein certain components of a vehicle have been removed for clarity of illustration.
Figure 8:
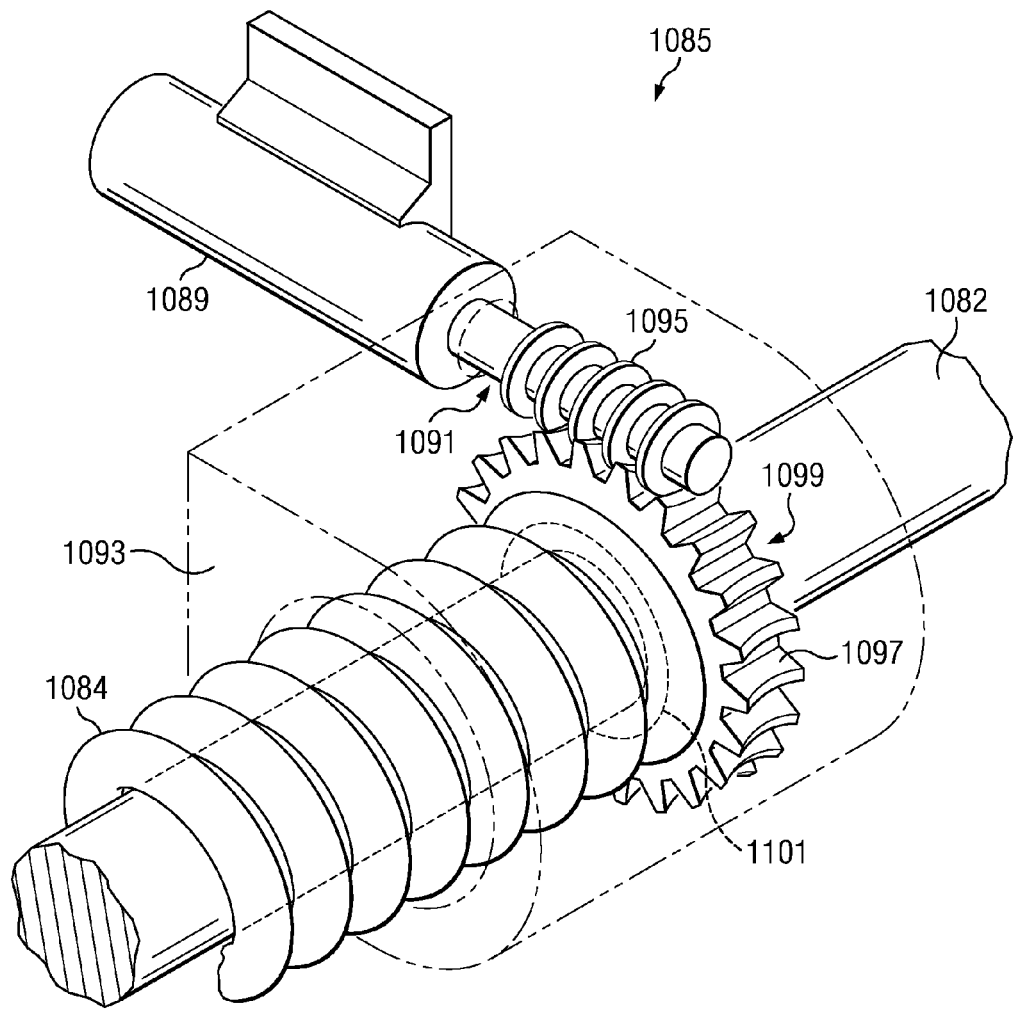
FIG. 8 is an enlarged view depicting a motor of the sway bar assembly of FIG. 7, wherein a motor housing is shown in dashed lines.

FIGS. 7 and 8 illustrate a sway bar assembly 1080 according to another embodiment. The sway bar assembly 1030 illustrated in FIGS. 7 and 8 can be similar to, or the same in many respects to the sway bar assembly 80 shown in FIGS. 2 and 3. For example, the sway bar assembly 1080 can include a sway bar 1082, a torsion spring 1084, and a winder assembly 1085. The torsion spring 1084 can be installed over the sway bar 1082. The winder assembly 1085, however, can include a collar 1087 and a motor 1089. The collar 1087 can be coupled with the torsion spring 1084 and with a central portion 1086 of the sway bar 1082. In one embodiment, the collar can be rigidly coupled to each of the sway bar 1082 and the torsion spring 1084, such as through welding, for example. In other embodiments, a collar can be coupled (e.g., rigidly or releasably) to a sway bar and a torsion spring in any of a variety of suitable alternative arrangements.

As illustrated in FIG. 8, the motor 1089 can include a rotary 1091 that extends into a motor housing 1093. The rotary shaft 1091 can define a wormed gear surface 1095 that intermeshes with a gear surface 1097 of a spur gear 1099. The spur gear 1099 can be coupled with the torsion spring 1084 and rotatably supported with respect to the sway bar 1082 by a bearing 1101. Operation of motor 1089 (e.g., through actuation of a pushbutton or other automated control) can rotate the spur gear 1099 to rotate the torsion spring 1084 to increase or decrease height of the rear (e.g., 21) of the vehicle (e.g., 10).

Figure 9:
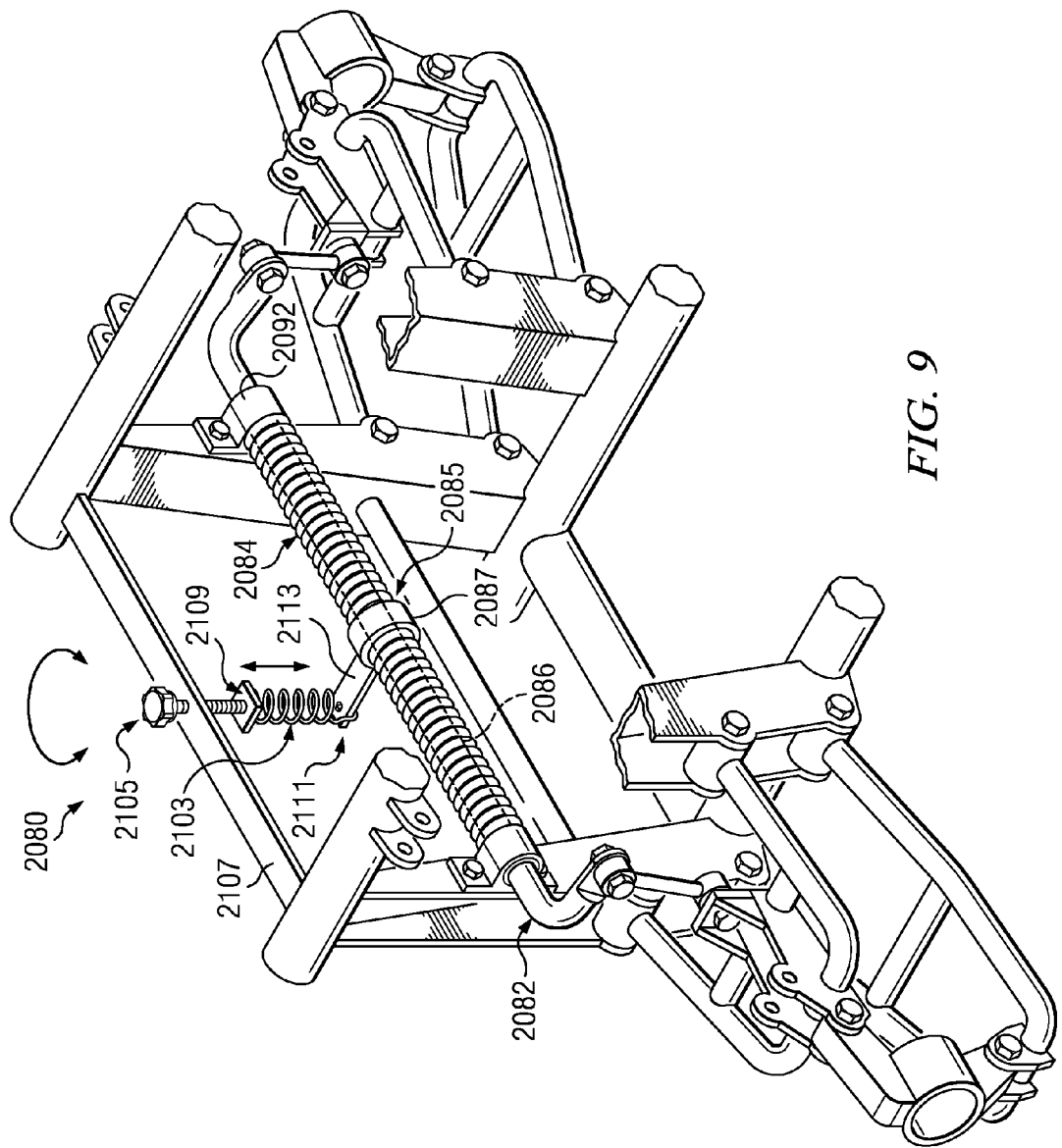
FIG. 9 is a right front perspective view depicting a sway bar assembly in accordance with yet another embodiment, wherein certain components of a vehicle have been removed for clarity of illustration.

FIG. 9 illustrates a sway bar assembly 2080 according to yet another embodiment. The sway bar assembly 2080 illustrated in FIG. 9 can be similar to, or the same in many respects to the sway bar assembly 80 shown in FIGS. 2 and 3. For example, the sway bar assembly 2080 can include a sway bar 2082, a torsion spring 2084, and a winder assembly 2085. The torsion spring 2084 can be installed over the sway bar 2082 and coupled with a bushing bracket 2092. The winder assembly 2085, however, can include a collar 2087, an actuator spring 2103, and a threaded actuator 2105. The collar 2087 can be coupled with the torsion spring 2084 and with a central portion 2086 of the sway bar 2082. The threaded actuator 2105 can be rotatably supported by a cross member 2107 and threadedly engaged with a first end 2109 of the actuator spring 2103. A second end 2111 of the actuator spring 2103 can be coupled to an arm 2113 of the collar 2087. Rotation of the threaded actuator 2105 can move the first end 2109 of the actuator spring 2103 upwardly or downwardly which can rotate the collar 2087 to respectively increase or decrease the height of the rear (e.g., 21) of the vehicle (e.g., 10). During operation of the vehicle 10, the actuator spring 2103 can cooperate with the torsion spring 2084 to prevent the rear wheels 39 from losing contact with the ground (e.g., when the vehicle 10 encounters uneven terrain).

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
    a frame;
    a left support arm pivotally coupled with the frame and pivotable with respect to the frame about a first axis;
    a right support arm pivotally coupled with the frame and pivotable with respect to the frame about a second axis, the first and second axes being substantially parallel;
    a left wheel rotatably coupled with the left support arm;
    a right wheel rotatably coupled with the right support arm; and
    a sway bar assembly comprising:
        a sway bar comprising a central portion, a left end portion, and a right end portion, the central portion pivotally coupled with the frame and pivotable with respect to the frame about a third axis that is substantially perpendicular to the first and second axes, the left end portion coupled with the left support arm, and the right end portion coupled with the right support arm, wherein the left end portion and the right end portion extend away from the third axis in substantially the same direction; and
        a biasing member fixed to the frame; and
        a winder assembly coupled with the biasing member and configured to facilitate selective movement of at least a portion of the biasing member with respect to the sway bar.

2. The vehicle of claim 1 wherein the biasing member comprises a torsion spring extending at least partially between the left end portion and the right end portion, the torsion spring comprising a pair of distal ends that are each fixed to the frame.

3. The vehicle of claim 2 further comprising a pair of bushing brackets pivotally coupling the sway bar to the frame, wherein each of the distal ends of the torsion spring is fixed to a respective one of the bushing brackets.

4. The vehicle of claim 3 wherein the torsion spring comprises an elongate helical torsion spring that surrounds at least a portion of the central portion of the sway bar.

5. The vehicle of claim 4 wherein the central portion of the sway bar extends along a longitudinal axis and wherein the elongate helical torsion spring extends coaxially with the central portion along at least a portion of the longitudinal axis.

6. The vehicle of claim 1 wherein the winder assembly comprises a winding collar and a fastener, the winding collar is coupled with the biasing member, and the fastener is configured to selectively fix the winding collar in position relative to the sway bar.

7. The vehicle of claim 1 wherein the winder assembly comprises an actuator spring, a collar, and a threaded actuator, the threaded actuator is rotatably coupled with the frame, a first end of the actuator spring is threadedly engaged with the threaded actuator, a second end of actuator spring is coupled with the collar, and the collar is coupled with the biasing member.

8. The vehicle of claim 1 wherein the winder assembly comprises a motor coupled with the biasing member and configured to facilitate movement of at least a portion of the biasing member with respect to the sway bar.

9. The vehicle of claim 1 wherein the left end portion and the right end portion extend generally parallel with one another and each of the left end portion and the right end portion extends generally perpendicularly from the central portion of the sway bar.

10. The vehicle of claim 1 further comprising a left link member and a right link member, wherein the left link member is pivotally coupled with each of the left end portion of the sway bar and the left support arm, and the right link member is pivotally coupled with each of the right end portion of the sway bar and the right support arm.

11. A vehicle comprising:
    a frame;
    a left support arm pivotally coupled with the frame about a first axis;
    a right support arm pivotally coupled with the frame;
    a left wheel rotatably coupled with the left support arm;
    a right wheel rotatably coupled with the right support arm; and
    a sway bar assembly comprising:
        a sway bar comprising a central portion, a left end portion, and a right end portion, the central portion pivotally coupled with the frame, the left end portion coupled with the left support arm, and the right end portion coupled with the right support arm; and
        a biasing member fixed to the frame; and
    a winder assembly coupled with the biasing member and configured to facilitate selective movement of at least a portion of the biasing member with respect to the sway bar;
    wherein the winder assembly comprises a winding collar and a fastener, the winding collar is coupled with the biasing member, the fastener is configured to selectively fix the winding collar in position relative to the sway bar, and the winding collar defines a plurality of receptacles configured to receive a winding tool.

12. A sway bar assembly comprising:
    a sway bar comprising a central portion, a left end portion, and a right end portion, the central portion being configured for pivotal coupling to a frame of a vehicle about an axis, the left end portion being configured for coupling with a left support arm, and the right end portion being configured for coupling with a right support arm, wherein the left end portion and the right end portion extend away from the axis in substantially the same direction;
    a biasing member configured to be fixed to the frame of the vehicle; and
    a winder assembly coupled with the biasing member and configured to facilitate selective movement of at least a portion of the biasing member with respect to the sway bar; wherein
    the biasing member comprises a torsion spring having a pair of distal ends each configured to be fixed to the frame of the vehicle;

the sway bar assembly further comprises a pair of bushing brackets configured to pivotally couple the sway bar with the frame of the vehicle, wherein each of the bushing brackets is fixed to a respective one of the distal ends of the torsion spring.

13. A sway bar assembly comprising:
a sway bar comprising a central portion, a left end portion, and a right end portion, the central portion being configured for pivotal coupling to a frame of a vehicle about an axis, the left end portion being configured for coupling with a left support arm, and the right end portion being configured for coupling with a right support arm, wherein the left end portion and the right end portion extend away from the axis in substantially the same direction;
a biasing member configured to be fixed to the frame of the vehicle; and
a winder assembly coupled with the biasing member and configured to facilitate selective movement of at least a portion of the biasing member with respect to the sway bar; wherein
the winder assembly comprises a winding collar and a fastener, the winding collar is coupled with the biasing member, and the fastener is configured to selectively fix the winding collar in position relative to the sway bar.

14. A vehicle comprising:
a frame;
a left support arm pivotally coupled with the frame;
a right support arm pivotally coupled with the frame;
a left wheel rotatably coupled with the left support arm;
a right wheel rotatably coupled with the right support arm;
a sway bar assembly comprising:
a sway bar comprising a central portion, a left end portion, and a right end portion, the central portion pivotally coupled with the frame and pivotable with respect to the frame about an axis, the left end portion coupled with the left support arm, and the right end portion coupled with the right support arm, wherein the left end portion and the right end portion extend away from the axis in substantially the same direction;
a torsion spring comprising a pair of distal ends, the torsion spring extending at least partially between the left end portion and the right end portion, and each of the distal ends being fixed to the frame; and
a winder assembly coupled with the torsion spring and configured to facilitate selective movement of at least a portion of the torsion spring with respect to the sway bar;
a left link member pivotally coupled with each of the left end portion of the sway bar and the left support arm; and
a right link member pivotally coupled with each of the right end portion of the sway bar and the right support arm.

15. The vehicle of claim 14 wherein the winder assembly comprises a winding collar and a fastener, the winding collar is coupled with the torsion spring, and the fastener is configured to selectively fix the winding collar in position relative to the sway bar.

16. The vehicle of claim 14 wherein the winder assembly comprises a motor coupled with the biasing member and configured to facilitate movement of at least a portion of the torsion spring with respect to the sway bar.

\* \* \* \* \*

UNITED STATES PATENT AND TRADEMARK OFFICE
CERTIFICATE OF CORRECTION

| | | |
|---|---|---|
| PATENT NO. | : 8,505,938 B2 | Page 1 of 1 |
| APPLICATION NO. | : 13/117458 | |
| DATED | : August 13, 2013 | |
| INVENTOR(S) | : Darin D. King | |

It is certified that error appears in the above-identified patent and that said Letters Patent is hereby corrected as shown below:

In the Specification
Column 2, line 43, change "downwardly, position" to --downwardly position--;
Column 4, line 15, change "huh" to --hub--;
Column 4, line 23, change "FIG." to --FIG. 2.--;
Column 4, line 24, change "2, and 3" to --2 and 3--;
Column 4, line 48, change "sway, bar" to --sway bar--;
Column 5, line 22, change "be, appreciated" to --be appreciated--;
Column 6, line 45, change "illustrated in the" to --illustrated in FIG. 3, the--;
Column 7, lines 32-33, change "vehicle. 10" to --vehicle 10--;
Column 7, line 58, change "cellar 112" to --collar 112--;
Column 8, line 25, change "sway bar assembly 1030" to --sway bar assembly 1080--;
Column 8, line 35, change "collar can" to --collar 1087 can--;
Column 8, lines 40-41, change "rotary 1091" to --rotary shaft 1091--; and
Column 8, line 49, change "height" to --the height--.

Signed and Sealed this
Eighth Day of October, 2013

Teresa Stanek Rea
*Deputy Director of the United States Patent and Trademark Office*